United States Patent [19]

Cardenas

[11] Patent Number: 5,671,867
[45] Date of Patent: Sep. 30, 1997

[54] ARTICLE PACKAGING SYSTEM FOR AN AUTOMATED ARTICLE DISPENSING MECHANISM

[76] Inventor: Daniel Cardenas, 2041 Shallowford Rd., Marietta, Ga. 30066

[21] Appl. No.: 527,220

[22] Filed: Sep. 12, 1995

[51] Int. Cl.⁶ .................................................. G07F 11/58
[52] U.S. Cl. .................... 221/72; 221/74; 221/77; 221/79; 221/82; 221/84; 221/86; 221/89; 198/803.13
[58] Field of Search .................. 221/72, 74, 77, 221/78, 79, 82, 84, 85, 86, 89; 198/803.1, 803.13

[56] References Cited

U.S. PATENT DOCUMENTS

| | | | |
|---|---|---|---|
| 2,864,412 | 12/1958 | Ponder | 198/803.1 |
| 3,088,629 | 5/1963 | Seymour | 221/77 |
| 3,298,567 | 1/1967 | Haan | 221/74 |
| 5,490,591 | 2/1996 | Falkner | 198/803.13 |
| 5,564,556 | 10/1996 | Spada et al. | 198/803.13 |

FOREIGN PATENT DOCUMENTS 4899  1/1977  Japan ................................. 221/84

*Primary Examiner*—William E. Terrell
*Assistant Examiner*—Khoi H. Tran
*Attorney, Agent, or Firm*—H. Jay Spiegel

[57] ABSTRACT

An article packaging system for an automated article dispensing mechanism includes a plurality of clamshell-like containers attached together by side support rails. Each clamshell includes two semi-cylindrical halves pivotably mounted together and pivotable between open and closed positions. Resilient elongated bands bias the cylindrical halves in the direction of closure. When two adjacent pairs of rails are pivoted in one direction with respect to one another, the clamshells are maintained closed. Conversely, when two pairs of side support rails are pivoted in another direction with respect to one another, the cylindrical halves pivot with respect to one another to open a clamshell. The dispensing mechanism may be guided through the use of a sprocket or sprockets or, alternatively, side supports with guide slots receiving pins extending laterally from the side support rails may be employed.

9 Claims, 3 Drawing Sheets

ARTICLE PACKAGING SYSTEM FOR AN AUTOMATED ARTICLE DISPENSING MECHANISM

BACKGROUND OF THE INVENTION

The present invention relates to an improved article packaging system for an automated article dispensing mechanism. In the prior art, article dispensing mechanisms of various types are well known. Check controlled dispensing machines are used to dispense a variety of products including candy bars, other food products, toiletries as well as beverages.

To this time, Applicant is unaware of any such dispensing machine which is specifically designed to dispense heavier articles such as, for example, cylindrically shaped batteries, milk jugs, loaves of bread, canned drinks and foods, newspapers and the like. For such articles, a different kind of dispensing mechanism must be employed which maintains the article within its own chamber during storage within the dispensing machine and up until it is dispensed to the consumer. To this time, Applicant is unaware of any such packaging system which works as a secondary protective wrapper for the products to be dispensed, at the same time comprising the container and stock rotator of the packaged product, once installed in the vending device, from the point of manufacturing to the point of sale and specifically designed for fast loading of product into the vending machine and empty unloading which permits the fast loading of products therein in one single operation. It would be advantageous for easy unloading to occur once the packaging system has been emptied. At the same time, a packaging system which provides protection of the integrity of the article contained would be an improvement. For example, canned soft drinks are loaded into a vending machine one at a time. It would be advantageous to provide a packaging system wherein the operator installs many products at once.

It is with this need in mind that the present invention was developed.

SUMMARY OF THE INVENTION

The present invention relates to an improved article packaging system for an automated article dispensing mechanism. The present invention includes the following interrelated objects, aspects and features:

(A) In a first aspect, the present invention is intended to be incorporated into a dispensing mechanism of the type that receives money in the form of bills and/or coins, includes a check control device designed to check the validity of the money tendered, and when satisfied that the money tendered is valid, dispenses the requested product or products.

(B) The present invention is particularly adapted to be employed, by making the structure thereof in a desired size, to dispense large and heavy articles such as, for example, milk jugs, loaves of bread, canned drinks and foods, bottles of water, newspapers and storage batteries. One particular category of product for which the present invention is particularly effective is that of storage batteries, particularly 1½ volt batteries which are marketed in various sizes such as the industry standard sizes AAA, AA, C and D.

(C) The present invention consists of an elongated string of generally cylindrically shaped clamshells held together by a series of side support rails, each of which extends from a center axis of a clamshell to the center axis of an adjacent clamshell.

(D) Each clamshell consists of two generally cylindrical halves which are pivotably mounted together and define an internal, generally cylindrical chamber.

(E) Each side support rail includes a L-shaped slot therein designed to receive a laterally extending pin attached to one of the cylindrical halves of a clamshell.

(F) A resilient elongated band such as a rubber band or a coiled spring band is attached between the above-referenced laterally extending pin and a further laterally extending pin which defines the pivot point about which the clamshell cylindrical halves pivot. These elastic bands are provided to bias the cylindrical halves in the direction of closing the internal chamber of each clamshell.

(G) When two adjacent side support rails are pivoted with respect to one another in a first direction, the first-mentioned laterally extending pins leave the L-shaped slots allowing the resilient elongated bands to maintain the associated clamshell in its closed position. Conversely, if two adjacent side support rails are pivoted with respect to one another in the opposite direction, the first-mentioned laterally extending pins are maintained within their respective L-shaped slots and the pivoting motion of the rails causes the cylindrical halves of the clamshells to pivot with respect to one another against the biasing force of the resilient elongated bands to open a clamshell thereby allowing dispensing of a product contained therein or filling of the clamshell with a product which is to be later dispensed.

(H) In one embodiment of the present invention, a string of clamshells and side support rails may be installed within an article dispensing machine in such a way that a motor drives the string of clamshells and side support rails to travel therewithin as controlled by guide sprockets so that, at one point along their path of travel, two adjacent side support rail pairs are pivoted in a direction permitting opening of a clamshell and dispensing of the product contained therewithin to a ramp mechanism to a point of pick up by the user. Of course, the direction of movement of the string of clamshells and side support rails may be reversed to allow filling of each clamshell with a product.

(I) Alternatively, side supports may be provided for a string of clamshells and side support rails which side supports include guide slots therein guiding the path of the clamshells and side support rails in such a manner that the side support rails are pivoted with respect to one another in a desired sequence to permit dispensing of articles from the clamshells.

The present invention provides the following advantages over the prior art:

1) It avoids unnecessary additional packaging materials for product transfer from the manufacturing plant to point of sale;

2) It reduces merchandise breakage and pilferage during the handling process;

3) It helps speed up the placement of products in vending devices by permitting installation of one spool filled with a quantity of products instead of loading products one by one;

4) It provides means to verify electronic transactions for environments which operate with different payment methods such as cash, prepaid debit cards or I.D. authorization systems; and 5) It provides efficient self-stock rotation for appropriate displacement for maintenance of product freshness, because it precludes the customer from extracting the fresher product from the rear of the storage area.

As such, it is a first object of the present invention to provide an improved article packaging system for an automated article dispensing mechanism.

It is a further object of the present invention to provide such a device including a string of clamshells held together by side support rails.

It is a still further object of the present invention to provide such a mechanism incorporated into an article dispensing machine having a check control device and a dispensing chute.

It is a yet further object of the present invention to provide such a device wherein each clamshell is made of a pair of cylindrical halves biased to a closed position through the use of resilient elongated bands.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
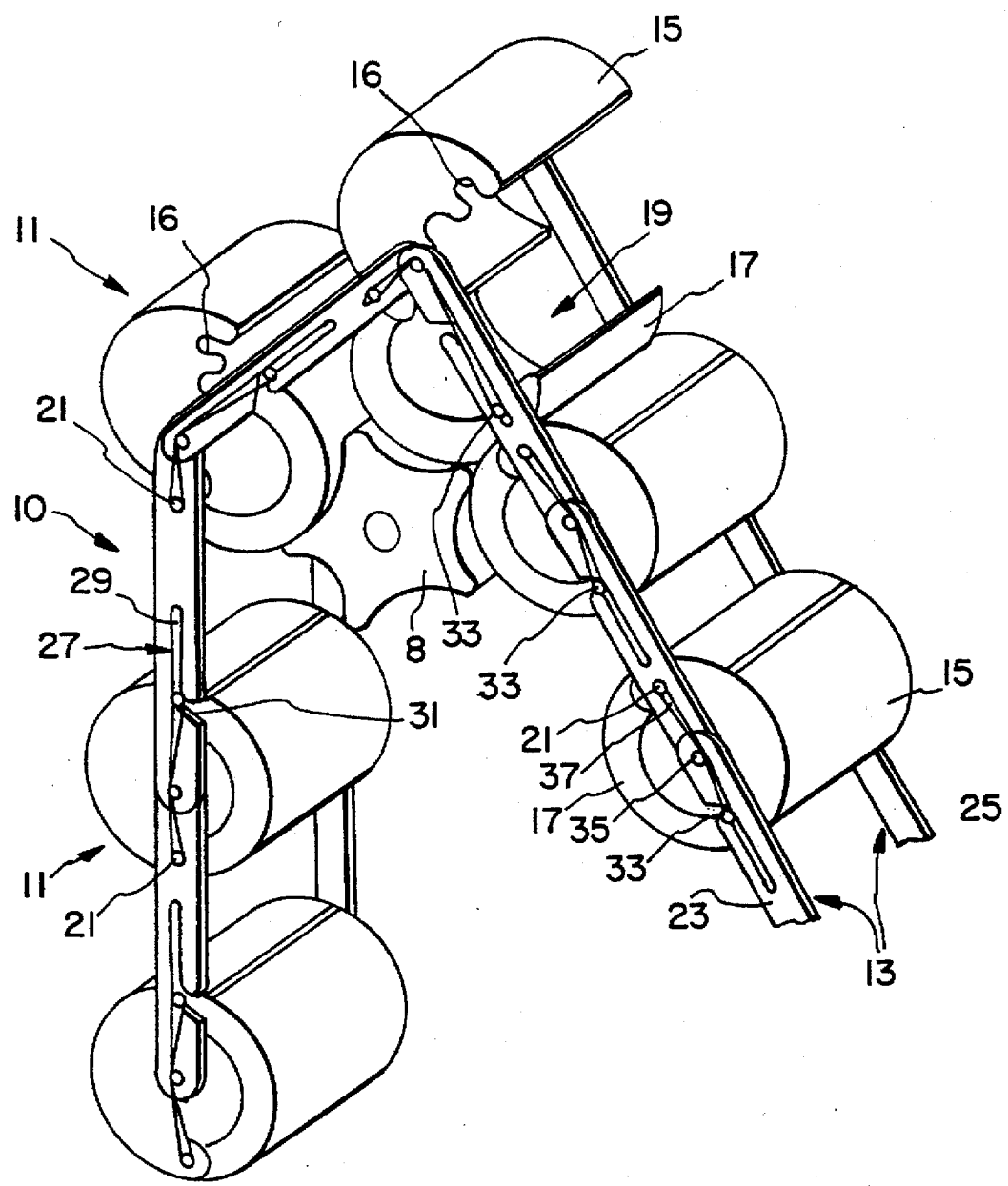
FIG. 1 shows a perspective view of a string of clamshells and side support rails draped over a guide sprocket.
Figure 2:
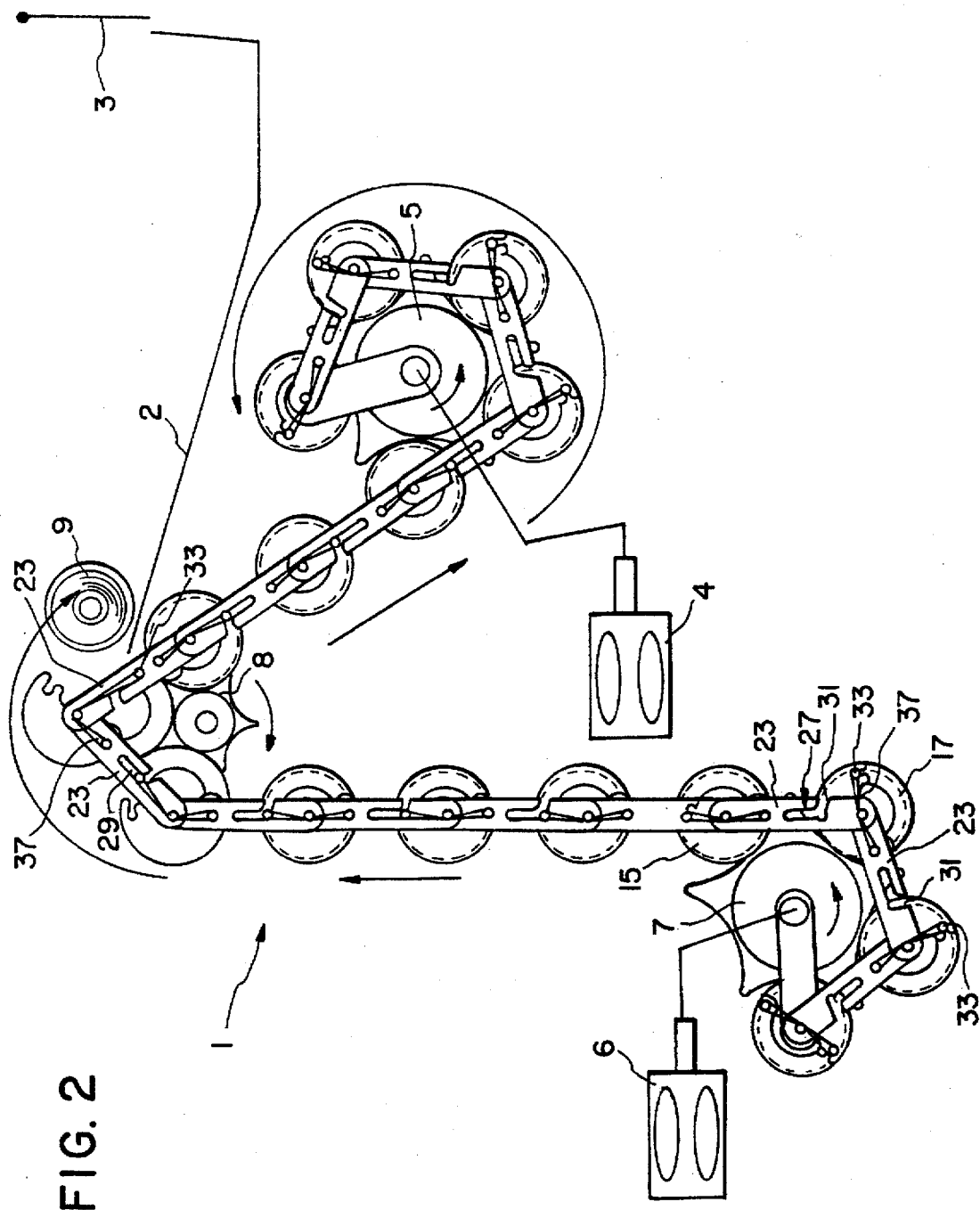
FIG. 2 shows a side view of a preferred installation of a string of clamshells and side support rails within an article dispensing mechanism.

With reference, first, to FIGS. 1 and 2, a string of clamshell containers and side support rails is generally designated by the reference numeral 10 and is seen to include a plurality of clamshells 11 as well as a plurality of pairs of side rails 13. Each clamshell 11 includes a first half 15 and a second half 17 defining, therebetween, an internal chamber 19 (FIG. 1). The clamshell halves 15 and 17 are pivotably attached together by pivot means comprising a pivot pin 21 which is rotatably fastened to an adjacent side rail.

Each pair of side support rails 13 includes a rail 23 and an identical rail 25 each of which rotatably receives an end of each pivot pin 21. Each of the rails, 23 or 25, includes a L-shaped slot 27 including a first slot portion 29 which extends generally along the axis of elongation of the rail and a second further slot portion 31 which extends at an oblique angle with respect thereto.

Each clamshell half 17 has a pair of laterally extending pins 33 of which only the pins on the rails 23 are visible in the drawings. These pins 33 are provided for a purpose to be described in greater detail hereinafter.

Adjacent rails 23, 23 or 25, 25 are pivotably attached together at pivot pins 35. In order to bias the halves 15 and 17 of each clamshell 11 toward the closed position, on each of the rails 23 and 25, biasing means comprising an elastic band 37 is provided which extends between the pins 21 and 33 and extends over the pin 35 as clearly seen in FIGS. 1 and 2. Each of the clamshells 11 includes a recess 16 designed to receive a pin 33 when the clamshell halves 15 and 17 are in the closed position.

With particular reference to FIG. 2, an article dispensing machine 1 is partially shown and is seen to include a dispensing chute 2, an access door 3, a dispensing motor 4 operatively connected to the take-up sprocket 5, a refilling motor 6 operatively connected to the supply sprocket 7 and a guide roller 8.

As clearly shown in FIG. 2, the string of clamshells 10 extends around the sprocket 7 with the rails 23 pivoted with respect to one another in such a way that the pins 33 have left the slots 27 via the slot portions 31. The bands 37, in such configuration, maintain closure of the clamshell halves. When the clamshells 11 travel over the sprocket 8, as shown in FIG. 2, the rails 23, 25 are pivoted in the opposite direction to the direction with which they have pivoted while travelling around the sprocket 7. When they are pivoted while travelling over the sprocket 8, the pins 33 are captured within the slot portions 29 of the slots 27 thereby causing the clamshell halves to pivot with respect to one another against the biasing force of the bands 37 to permit a product such as the battery 9 illustrated in FIG. 2 to be released therefrom and to travel down the chute 2 to a location at the end thereof where the consumer may open the door 3 and retrieve them.

As should be understood from FIG. 2, the dispensing motor 4 controls rotation of the sprocket 5 in the direction of the arrow shown to cause dispensing of articles such as the battery 9. The refilling motor 6 does not operate while the motor 4 operates and is only used once all of the clamshells 11 have been emptied so that, in the reverse direction, when each clamshell 11 reaches a point above the sprocket 8, each clamshell may be refilled with product. Of course, when the refilling motor 6 is operating, the motor 4 does not operate. Furthermore, the arrow shown on the sprocket 7 is the direction of rotation of the sprocket 7 when the motor 4 is operating. The sprocket 7 turns in the opposite direction to the shown arrow when the refilling mode is undertaken.

Figure 3:
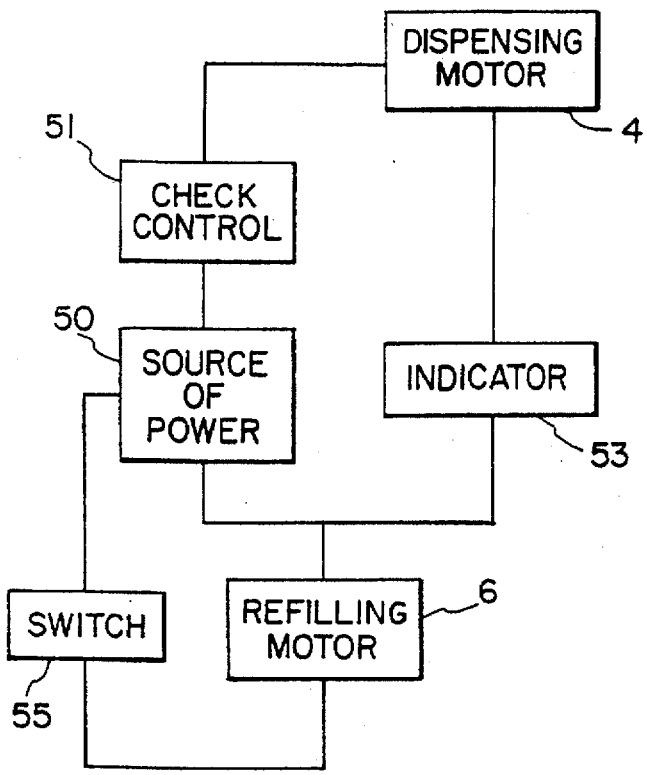
FIG. 3 shows a schematic representation of the electrical circuitry of the present invention.

With reference to FIG. 3, the electrical circuit of the present invention is schematically shown.

As shown, a source of power 50 which may comprise 110 volt 60 cycle electricity controls the system. A check control 51 is schematically shown and may include a coin and bill receiver which may include circuitry to check the validity of coins and bills placed within the machine 1. Once the validity has been verified, the dispensing motor 4 may be operated an incremental amount of time or number of revolutions to cause the next clamshell 11 to arrive at a point above the sprocket 8 where the clamshell halves 15 and 17 open to allow the battery 9 to be removed from the chamber 19 and to travel down the chute 2 to a point where the user may retrieve it. An indicator 53 indicates (1) the amount of money received by the check control device, (2) whether the machine 1 is empty or has product, and (3) any other desired indication.

When it is desired to refill the clamshells 11, the switch 55 may be operated to activate the refilling motor 6 to move the string of clamshells and side support rails in the opposite direction of the arrow shown on the sprocket 7 in an incremental fashion to allow refilling of the clamshells 11.

Figure 4:
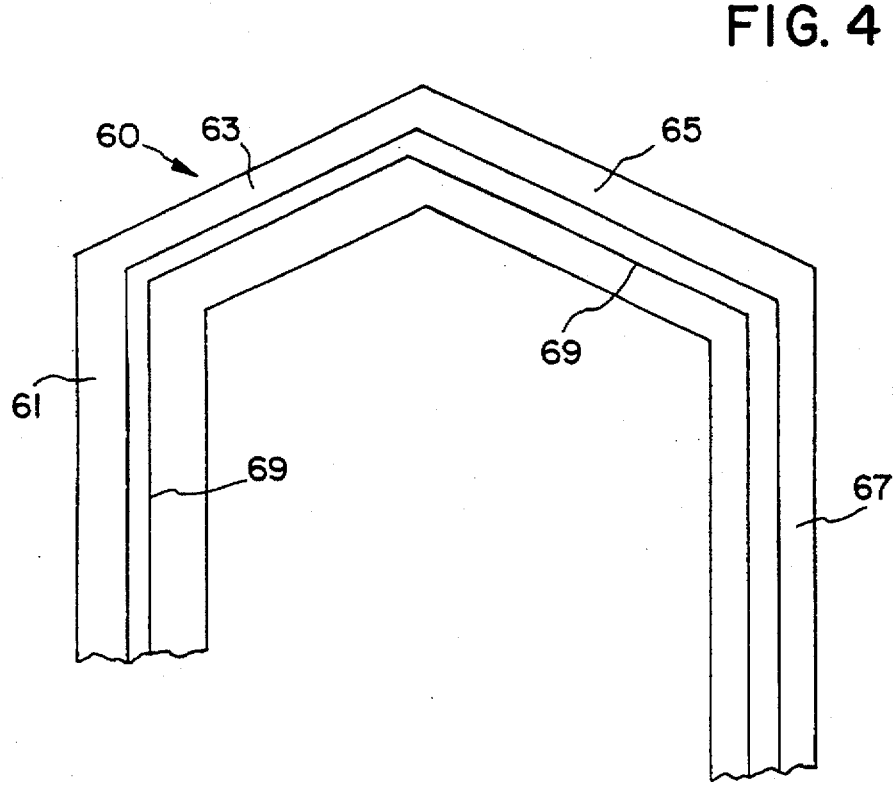
FIG. 4 shows a side view of a portion of a side support for guiding a string of clamshells.

With reference to FIG. 4, a side support 60 is seen to include a series of interconnected legs 61, 63, 65 and 67 which together define a continuous slot 69. The slot 69 is sized to receive lateral extensions of the pins 35 which interconnect the rails 23 and 25. In this way, the rails may be suitably guided in a path similar to that which is shown in FIG. 2. Movement of the rails 23, 25 along the slot 69 causes the pivoting of adjacent rails 23, 25 in the manner described hereinabove to cause dispensing of products such as the battery 9 therefrom.

The clamshells 11 and, accordingly, the side support rails 23, 25 may be made in any desired sizes to accommodate to the particular sizes of products which are to be dispensed therefrom. For example, the clamshells 11 may be provided in a size large enough to suitably hold a 1 liter drink bottle. Similarly, the clamshells 11 may be sized to allow receipt of food cans of any desired size, batteries of any desired sizes, loaves of bread, or any other product for which it is desired to facilitate dispensing through an article dispensing machine.

As such, an invention has been disclosed in terms of preferred embodiments thereof which fulfill each and every one of the objects of the present invention as set forth hereinabove and provide a new and useful article packaging system for an automated article dispensing mechanism of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. An article packaging system for an automated article dispensing mechanism comprising:
   a) a clamshell container including generally semi-cylindrical container halves pivotably mounted together about pivot means to permit opening and closing of an internal chamber thereof;
   b) biasing means for biasing said halves toward one another in a direction of closure of said chamber;
   c) first and second side rails, said first side rail pivotably mounted to said pivot means at one side of said container, said second side rail pivotably mounted to said pivot means at another side of said container;
   d) third and fourth side rails, said third side rail pivotably mounted to said first side rail and including a slot, said fourth side rail pivotably mounted to said second side rail and including a further slot;
   e) one of said halves having a first pin receivable in said slot and a second co-axially disposed pin receivable in said further slot;
   f) whereby when said third and fourth rails are concurrently pivoted with respect to said first and second rails, respectively, in a first direction, said first and second pins leave said slot and further slot, respectively, and said biasing means maintains said halves in a closed position of said chamber; and
   g) when said third and fourth rails are concurrently pivoted with respect to said first and second rails, respectively, in a second direction opposite to said first direction, said first and second pins are maintained in said slot and further slot, respectively, and said halves are pivoted with respect to one another to open said chamber.

2. The system of claim 1, wherein said internal chamber is cylindrical.

3. The system of claim 1, wherein said biasing means comprises an elastic band.

4. The system of claim 1, wherein each of said slots is L-shaped including a first slot portion extending generally along an axis of elongation of said third or fourth side rail and a second slot portion extending from said first slot portion and opening at a side wall of said third or fourth side rail.

5. The system of claim 1, further including a fifth side rail pivotably attached to said third side rail and a sixth side rail pivotably attached to said fourth side rail and a further clamshell container having pivot means connected to said third and fourth side rails.

6. The system of claim 5, including a multiplicity of clamshell containers interconnected together by side rails to form a string of clamshell containers.

7. The system of claim 6, further including an article dispenser including:
   a) a supply sprocket for receiving a first end of said string of clamshell containers in a first rotative direction;
   b) a take-up sprocket for receiving a second end of said string of clamshell containers in said first rotative direction;
   c) a guide roller between said sprockets for guiding said string of clamshell containers thereover in a second rotative direction;
   d) a product contained within each clamshell container;
   e) whereby when said containers are wound about said sprockets, said containers are maintained closed by said biasing means, and when said containers travel over said guide roller, they open to dispense a product therefrom.

8. The system of claim 7, wherein said product comprises a battery.

9. The system of claim 8, further including a dispensing chute extending from adjacent said guide roller.

* * * * *